United States Patent [19]

Martinelli

[11] 4,375,658
[45] Mar. 1, 1983

[54] CLEANING DISK

[75] Inventor: Lawrence G. Martinelli, San Jose, Calif.

[73] Assignee: Verbatim Corporation, Sunnyvale, Calif.

[21] Appl. No.: 224,951

[22] Filed: Jan. 14, 1981

[51] Int. Cl.³ .................... G11B 5/41; G11B 23/02; G11B 25/04
[52] U.S. Cl. .................... 360/128; 360/86; 360/99; 360/133
[58] Field of Search .......... 360/128, 133, 137, 86, 360/99, 135; 274/47; 15/210 R

[56] References Cited

U.S. PATENT DOCUMENTS

| | | | |
|---|---|---|---|
| 3,931,644 | 1/1976 | Ward | 360/86 |
| 4,038,693 | 7/1977 | Huffine et al. | 360/99 |
| 4,040,105 | 8/1977 | Slindee | 360/99 |
| 4,052,750 | 10/1977 | Barber et al. | 360/135 |
| 4,180,840 | 12/1979 | Allan | 360/128 |

FOREIGN PATENT DOCUMENTS

| | | | |
|---|---|---|---|
| 2556919 | 6/1976 | Fed. Rep. of Germany | 360/128 |
| 2045508 | 10/1980 | United Kingdom | 360/128 |

*Primary Examiner*—Alfred H. Eddleman
*Attorney, Agent, or Firm*—Thomas E. Schatzel

[57] ABSTRACT

An improved wet cleaning disk assembly for use in cleaning reading and writing transducers of a floppy disk drive. The cleaning disk assembly includes an envelope having apertures formed therethrough for receiving reading and writing transducers and a reinforced opening along one edge thereof for insertion of a cleaning disk thereinto. In use, a cleaning disk, presoaked with a liquid cleaning solution, is removed from a sealed package and inserted into the envelope to form the cleaning assembly which is then inserted into a floppy disk drive. A spindle within the drive passes through a central aperture therefor in the envelope and through a central aperture in the disk to thereby engage the disk and rotate it within the envelope. The envelope and cleaning disk also include sensing apertures adapted to permit optical sensing of disk rotation by the drive. The cleaning disk facilitates this sensing by means of an opaque, C-shaped region printed thereon within an annular region about the central aperture of the disk which includes the sensing aperture. The disk further includes an annular shaped reinforcement formed on a side surface of the disk in the region thereof which is engaged by the spindle of the floppy disk drive. This cleaning disk assembly may be used to clean a floppy disk drive having a single reading and writing transducer by securing a removable cover over one of the apertures formed therefor in the envelope prior to its insertion into such a drive.

7 Claims, 2 Drawing Figures

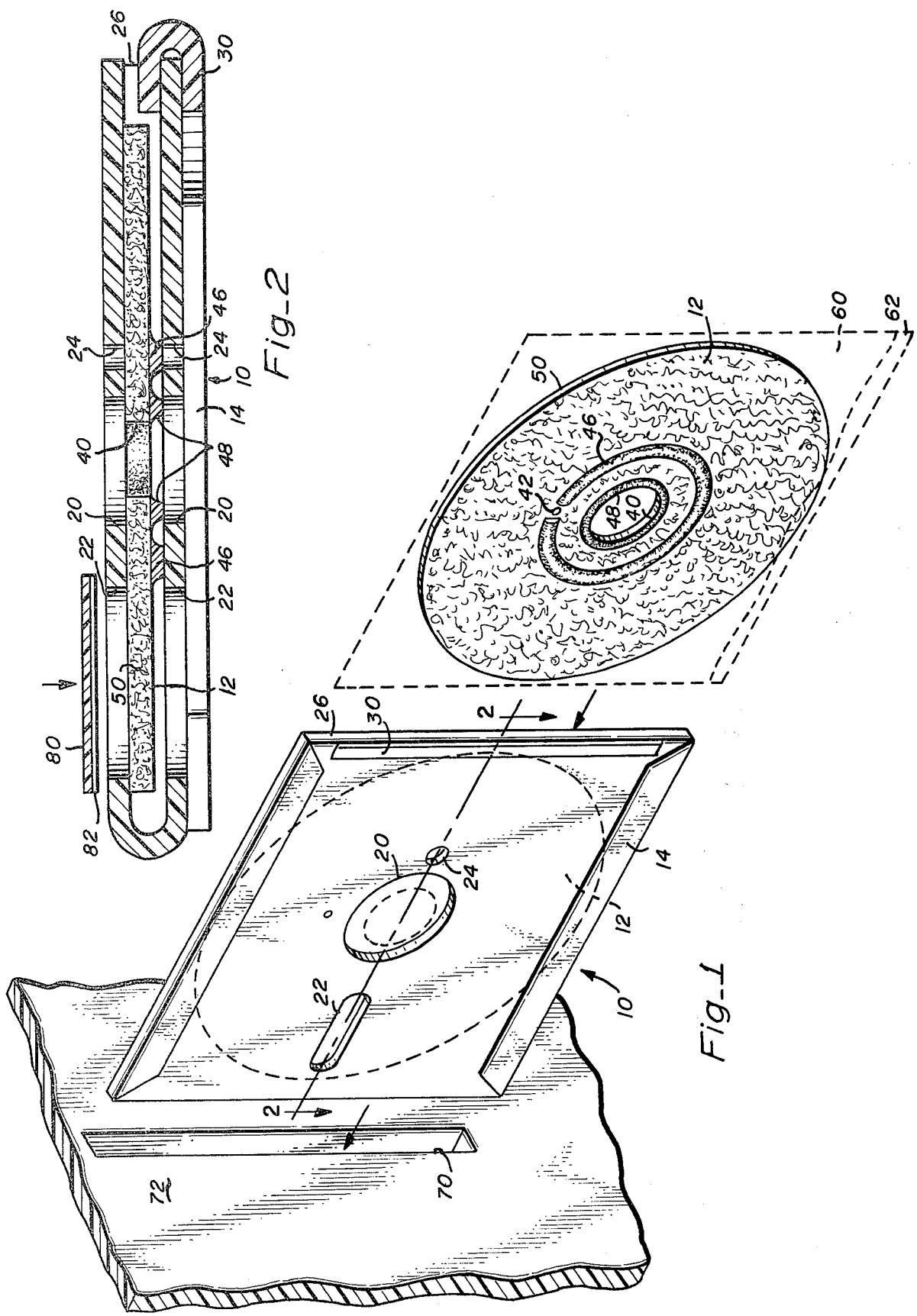

CLEANING DISK

BACKGROUND OF THE INVENTION

1. Field of the Invention

This invention relates to the field of magnetic recording and more particularly to an improved article of manufacture for cleaning the reading and writing transducers of floppy disk drives.

2. Description of the Prior Art

Widely used in the computer industry is a removable and interchangeable data storage medium assembled by sealing an annular-shaped disk of flexible material coated with magnetic particles within a square-shaped envelope. These assemblies are known in the trade as "floppy disks". A method of constructing floppy disk assemblies is described in U.S. Pat. No. 3,668,658 issued to Flores, et al. The envelope, as described in that patent, is formed with a circular aperture passing through the centers of its side surfaces. As further taught in that patent, the diameter of the circular aperture formed through the envelope is larger than that formed through the flexible recording disk. A larger aperture is formed in the envelope to permit engagement of the recording disk contained therein by a drive spindle of an apparatus used to write data to and read data from the flexible disk. Engagement of the flexible recording disk by the drive spindle is necessary to permit rotation of the disk within the envelope by the reading and writing apparatus so that all the storage area of the circular data tracks thereof may be accessed.

The envelopes of a floppy disk assembly are further formed with a radially positioned oblong aperture. This aperture permits the reading and writing transducer of a floppy disk drive to interact with the recording surface coated on the circular disk for recording or reproducing information thereon. Some floppy disk assemblies, known as "single sided floppy disks," are fabricated with such an oblong aperture formed through only one of the side surfaces of the envelope. Other floppy disk assemblies, known as "dual sided floppy disks," are fabricated with oblong apertures passing through both side surfaces of the envelope. Correspondingly, floppy disk drives are of two types respectively adapted to read data from and write data on floppy disk assemblies of these respective types. During such reading and/or writing operations, the reading and writing transducer of a floppy disk drive, regardless of type, is inserted through the oblong aperture in the envelope and enters into intimate contact with the recording surface of the flexible disk. In the case of dual sided floppy disk drives, the reading and writing transducers and the corresponding oblong apertures in the envelope of a floppy disk are arranged so as to oppose each other from opposite sides of the flexible recording disk. Thus, a dual sided flexible recording disk is gently clamped between opposing reading and writing transducers while information is being recorded thereon or recovered therefrom. In a similar fashion, a single sided floppy disk drive includes a member, generally made from felt, which opposes the reading and writing transducer and which contacts the outer surface of the envelope during reading and writing operations.

Because the floppy disk assembly may be removed from the floppy disk drive, these drives are constructed so that the reading and writing transducer contacts the flexible recording disk only when a floppy disk assembly is inserted therein, has been engaged by the spindle thereof, and is rotating. To permit sensing the rotation of the flexible recording disk, these assemblies generally include a circular aperture passing through the envelope with which a smaller circular aperture in the flexible recording disk may be aligned. The floppy disk drive then employs a light source and an optical sensor aligned with the aperture through the inserted envelope to sense the periodic alignment of the apertures as the flexible recording disk rotates. If a floppy disk drive does not sense the rotation of the flexible recording disk even though one be inserted, it will not attempt to move the reading and writing transducers into contact with the recording surface thereof.

The magnetic recording layer coated onto the annular-shaped sheet of flexible material generally comprises small particles of magnetic material and a lubricant dispersed throughout a binder material which adheres to the flexible sheet material. It is this coating which the reading and writing transducers of a floppy disk drive contact as data is stored on or recovered from the floppy disk assembly. In time, due to the intimate contact between these elements of the floppy disk drive and the floppy disk assembly, the transducers become contaminated with material abraded from the surface of the flexible recording disk. Left unattended, this contamination can become so severe as to prevent the proper recording and/or reading of data. Therefore, it has been found beneficial to periodically clean the surface of the reading and writing transducers to remove this contamination therefrom.

Methods of construction and the use of articles of manufacture to facilitate this cleaning of the reading and writing transducers of floppy disk drives have been disclosed in U.S. Pat. No. 4,065,798, issued to Sugisaki et al. and U.S. Pat. No. 4,106,067 issued to Masuyama et al. Both Sugisaki and Masuyama disclose a cleaning disk assembly, open along one edge, into which is inserted a circular disk of flexible head cleaning material. The circular cleaning disks of both the Sugisaki and Masuyama patents comprise a layer of non-magnetic support sheet material, analagous to the sheet material of the flexible recording disk. One surface of this sheet is coated with a magnetic layer in the case of Sugisaki or an antistatic layer in the case of Masuyama. The other surface of this sheet is coated with a fibrous material layer in both patents. The envelopes of both the Sugisaki and Masuyama patents further include a layer of lubricating material secured to the inner side surface of the envelope opposite to that contacted by the fibrous cleaning layer.

Currently, cleaning disk assemblies having a much simpler structure than that taught by Sugisaki and Masuyama are commercially available. These simpler cleaning disk assemblies employ only a circular disk of cleaning material formed from a sheet of spun-bonded fibrous material such as Reemay polyester fabric manufactured by Du Pont De Nemours E I & Company. However, these cleaning disks consisting solely of the fibrous material are permanently sealed into an envelope such as that normally used to enclose the flexible recording disks. Permanently sealed envelopes are used to contain the commercially available fibrous cleaning disks in order to prevent creasing them. The additional mechanical rigidity of a sealed envelope, not required for the cleaning disk assemblies taught by Sugisaki and Masuyama, is required for the soft fibrous cleaning disks because they do not supplement the mechanical rigidity of the envelope with the additional strength of the non-magnetic material layer to which Sugisaki and Masuyama secure the fibrous cleaning layer. Creasing of the fibrous cleaning disk causes the reading and writing transducers to bounce as the crease in the rotating disk passes them.

These cleaning disk assemblies employing only a layer of fibrous material may be separated into two categories, i.e., those having dry cleaning material and those having wet cleaning material. Those having dry cleaning material remove contamination from the reading and writing transducer by abrasion and physical entrapment of the contamination within the fibrous material of the cleaning disk. In order to assure proper operation of the floppy disk drive upon insertion of the cleaning disk therein, the dry cleaning disks are fabricated with an opaque piece of material adhesively bonded to the surface of the fibrous material about the aperture formed therethrough for sensing by the disk drive. The opaque material increases the optical density of the cleaning disk about the aperture so that the optical sensor incorporated into the floppy disk drive will provide a reliable signal.

The wet cleaning disk assemblies are of a generally similar construction to that of the dry cleaning assemblies with the major difference being that immediately prior to their use the material of the cleaning disk is satured with a cleaning solution. However, the wet cleaning disk assemblies currently cannot employ the adhesively bonded opaque material because the cleaning solution dissolves the adhesive. The lack of opaque material about the sensing aperture causes the presence of the wet cleaning disk assembly within the floppy disk drive to be sensed approximately one time out of five that the assemblies are inserted therein. Thus, on the average, a wet cleaning disk assembly must be inserted and removed from a floppy disk drive five times before the drive will sense its presence thereby permitting the reading and writing transducers to contact it and be cleaned. Another problem with the currently available wet cleaning disk assemblies is that the envelopes thus far used are fabricated from polyvinyl chloride. This material is generally subject to chemical attach and the cleaning solutions thus bleed monomers from the envelope material that may contaminate the floppy disk drive apparatus.

Because both the dry and wet cleaning disks are permanently sealed within an envelope, their cleaning effectiveness decreases with repetitive use which ultimately requires disposal of the entire cleaning disk assembly. Furthermore, the presence of cleaning solution saturated wet cleaning disk assemblies saved for future use creates a fire hazard because the solutions are generally compounded from combustible hydrocarbons.

Lastly, the commercially available dry and wet cleaning disk assemblies must be irreversible committed to use in a dual sided floppy disk drive because the envelopes incorporate a perforated pull-out tab which must be removed prior to use in dual sided drives. Removal of this pull-out tab renders the cleaning disk assembly unsuitable for use in a single sided drive because the felt surface opposing the head thereof will be damaged by contacting the rotating surface of the cleaning disk.

SUMMARY OF THE PRESENT INVENTION

An object of the present invention is to provide an improved wet cleaning disk assembly for use in cleaning reading and writing transducers of floppy disk drives.

Another object of the present invention is to provide a fibrous wet cleaning disk which may be reliably sensed by a floppy disk drive.

Another object of the present invention is to provide a reusable envelope for cleaning disk assemblies employing a solely fibrous cleaning disk.

Another object of the present invention is to provide an envelope to contain a wet cleaning disk made from a material impervious to chemical attack by the cleaning solution.

Another object of the present invention is to provide a cleaning disk assembly which may be successively used to first clean dual-sided floppy disk drives and then may be used to clean single-sided floppy disk drives.

Briefly, a wet cleaning disk assembly embodiment of the present invention includes an envelope formed from sheet Lexan polycarbonate which is shaped identically to that which may enclose a flexible recording disk. Thus, the envelope has a central aperture to receive a spindle of a floppy disk drive; oval, radial apertures to receive reading and writing transducers and an optical sensing apertures. In addition, the envelope has a reinforced opening formed along one edge to permit insertion and removal of cleaning disks. Reinforcement of this opening adds sufficient rigidity to the envelope so that fibrous cleaning disks are not easily creased.

A cleaning disk in accordance with this invention may be fabricated from a fibrous sheet of spun-bonded polyolefin material and is shaped identically to a flexible recording disk. Thus, the cleaning disk has a central aperture for engagement by a spindle of a floppy disk drive and an optical sensing aperture. Reliable sensing of this aperture by a floppy disk drive is obtained by printing a black, opaque member onto a side surface of the cleaning disk. The opaque member is C-shaped to lie within an annular region about the central aperture of the disk which includes the sensing aperture. In a similar fashion, the central aperture of the fibrous cleaning disk is reinforced by an annular region also printed on the surface of the cleaning disk. Both of these printed regions are formed from an ultraviolet polymerizable polyolefin material which when solidified is resistant to chemical attack by the cleaning solutions normally used.

After fabrication, this cleaning disk is enclosed within a sealed envelope along with a quantity of cleaning solution such is isopropyl alcohol thus preparing it for use. Use of the cleaning disk, thus prepared, merely requires removal from the sealed envelope, insertion into the reinforced polycarbonate envelope to establish the cleaning disk assembly, and then insertion of this assembly into a floppy disk drive. If the drive to be cleaned is a single-sided drive rather than a dual-sided drive, a cover is adhesively bonded to an outer side surface of the envelope over one of the reading and writing transducer apertures prior to insertion of the presaturated cleaning diskette thereinto. The adhesive coated onto this cover is applied only in those regions where it may adhere to the surface of the envelope. Thus, the solvent saturating the cleaning disk may not contact and chemically attack this adhesive because it is separated therefrom by the envelope material. Correspondingly, an envelope thus prepared for use with a single-sided drive may be converted to use with a dual-sided drive by merely removing the cover therefrom.

An advantage of the present invention is that it provides an improved wet cleaning disk assembly.

Another advantage of the present invention is that it provides reliable sensing of a wet cleaning diskette.

Another advantage of the present invention is that it provides a resuable envelope for use with soft, fibrous cleaning disks.

Another advantage of the present invention is that it provides an envelope for use with wet cleaning diskettes which is impervious to solvent attack.

Another advantage is that it provides a cleaning disk assembly which may be interchangeably used to clean dual and single-sided floppy disk drives.

These and other objects of the present invention will no doubt become obvious to those of ordinary skill in the art after having read the following detailed description of the preferred embodiment as illustrated in the various drawing figures.

IN THE DRAWING

FIG. 1 is a perspective view showing assembly and use of a wet cleaning disk assembly in accordance with the present invention; and FIG. 2 is a cross sectional view of the wet cleaning disk assembly taken along the line 2—2 of FIG. 1.

DETAILED DESCRIPTION OF THE PREFERRED EMBODIMENT

FIG. 1 shows assembly of a wet cleaning disk assembly in accordance with the present invention and referred to by the general reference character 10. The wet cleaning disk assembly 10 is established by inserting a cleaning disk 12 into an envelope 14. The envelope 14, formed from sheet Lexan polycarbonate material, is similar in shape and structure to that normally used for floppy disk assemblies. Thus, the envelope 14 has a central aperture 20 through which the spindle of a floppy disk drive may pass; an oblong, radially positioned reading and writing transducer aperture 22; and a circular, optical sensor aperture 24. While the envelope 14 may be formed with the transducer aperture 22 passing through only a single side of the envelope 14 thus adapting it for use in only single-sided floppy disk drives, the preferred envelope 14 has the transducer aperture 22 passing through both sides thus adapting it for use in dual sided floppy disk drives. The envelope 14 used for a wet cleaning disk assembly 10 differs from that normally used for a floppy disk assembly as described in U.S. Pat. No. 3,668,658 issued to Flores, et al. in that it does not have an inner layer of porous, antistatic wipe cleaning material. Also, an edge of the envelope 26, furthest from the reading and writing transducer aperture 22, is open to permit insertion and removal of the wet cleaning disk 12. As shown in FIG. 2, the mechanical rigidity of the envelope 14, reduced by the formation of an opening along the edge 26, is increased by securing a U-shaped reinforcement 30 about the sheet material of the envelope 14 exposed at the edge 26.

The envelope 14 may be folded from sheet Lexan polycarbonate material in accordance with the method and aparatus set forth in copending U.S. patent application Ser. No. 102,777, now U.S. Pat. No. 4,294,640, entitled "Improved Forming Process for Light Gauge Polymer Sheet Material" and assigned to the same assignee as this patent application. The reinforcement 30, also folded from sheet polycarbonate material, is secured to the side of the envelope 14 about the edge 26 either by gluing or welding. Lexan polycarbonate material is preferred for the envelope 14 because it is a fully polymerized material, containing substantially no monomers, and is impervious to chemical attack by solvents such as isopropyl alcohol used in cleaning solutions.

The cleaning disk 12, formed from a sheet of spunbonded polyolefin material, has a central aperture 40 which the spindle of a floppy disk drive may enter and a circular optical sensor aperture 42. The optical sensor aperture 42 is positioned with respect to the central aperture 40 such that it will periodically align with the optical sensor aperture 24 in the envelope 14 when the disk 12 is enclosed and rotated therein. Because spunbonded polyolefin materials having a thickness suitable for use in cleaning disks 12 have a low optical density, a C-shaped black, optically opaque member 46 is printed on a side surface of the disk 12 within an annular region centered about the aperture 40 which includes the optical sensor aperture 42. In a similar fashion, an annular reinforcement 48 is printed on a surface of the disk 12 about the central aperture 40. Both the C-shaped optically opaque member 46 and the reinforcement 48 may be printed onto the disk 12 by the method and apparatus disclosed in copending United States Patent application Ser. No. 208,516, filed 11-20-80, entitled "Improved Spindle Aperature Reinforcement for a Floppy Disk" and assigned to the same assignee as this application. Both the C-shaped optically opaque member 46 and the annular reinforcement region 48 are formed from an ultraviolet polymerizable polyolefin material which when solidified is resistant to chemical attack by the cleaning solutions normally used. In order to dissipate any static electric charge generated by rotating the cleaning disk 12 within the envelope 14, the surface of the disk 12 opposite to that on which the C-shaped optically opaque member 46 and the annular reinforcement 48 are printed is coated with a cross-linkable antistatic material 50 such as Astron 123 manufactured by Lydal Chemical Company. After the antistatic material 50 has been coated on the surface of the disk 12 it is cross linked so as to become permanently bonded to the fibers of the disk 12.

After the cleaning disk 12 has been fabricated, it is sealed within a shipping envelope 60 along with a quantity of liquid cleaning solution 62 such as isopropyl alcohol. Within the envelope 60, the cleaning solution 62 contacts the cleaning disk 12 and saturates it thus preparing it for use. The saturated cleaning disk 12 is used by tearing open the envelope 60, removing the cleaning disk 12 and inserting it into the envelope 14 thus forming the wet cleaning disk assembly 10. The wet cleaning disk assembly 10 is then inserted into a disk insertion aperture 70 of a floppy disk drive 72. If the floppy disk drive 72 into which the wet cleaning disk assembly 10 is inserted is a single sided drive, the envelope 14 is prepared for insertion of the cleaning disk 12 by securing a cover 80 to an outer surface of the envelope 14 about one of the apertures 22 as shown in FIG. 2. The cover 80 is precoated with an adhesive layer 82. The adhesive of the layer 82 is applied to the cover 80 only in regions which will contact the envelope 14. Thus, the adhesive of the layer 82 is not directly exposed to the wet cleaning solution 62 upon insertion of the cleaning disk 12. Thus the adhesive of the layer 82 will not contaminate the surface of the cleaning disk 12 nor will it be subjected to chemical attack by the cleaning solution 62. In a similar fashion, the cover 80 may be removed from the envelope 14 to prepare it for use in cleaning a dual-sided floppy disk drive 72.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A cleaning disk assembly for cleaning a reading and writing transducer of a floppy disk drive comprising:

an envelope for enclosing a cleaning disk formed from sheet polymeric material, the envelope having a circular central aperture formed through side surfaces thereof for receiving a spindle of a floppy disk drive to sense the presense of a cleaning disk enclosed within the envelope, the envelope further having a first aperture formed through a first side surface thereof for receiving a first reading and writing transducer of a floppy disk drive whereby said transducer may contact a surface of a cleaning disk enclosed within the envelope, the envelope including an edge opening formed along one edge thereof for inserting a cleaning disk thereinto and for removing a cleaning disk therefrom, the envelope further including a reinforcing means at said edge opening thereof for increasing the mechanical rigidity of the envelope, with said reinforcing means comprising a U-shaped strip of sheet polymeric material rigidly secured about the edge of one said side surface of the envelope immediately adjacent to said edge opening, in an enclosing manner about said edge of said side surface; and a circularly-shaped cleaning disk for insertion into the envelope formed from fibrous sheet cleaning material, the disk having a circular central aperture formed therethrough for engagement by a spindle of a floppy disk drive, the disk also having a sensing aperture formed therethrough for permitting a floppy disk drive to sense the presence of the cleaning disk when the cleaning disk is inserted into a floppy disk drive, the disk further including a C-shaped optically opaque annular member within an annular region of a surface of the disk centered about said central aperture, said annular region including said sensing aperture of the disk, and said C-shaped opaque annular member being comprised of an opaque polymeric material rigidly secured to a surface of said disk.

2. An envelope for enclosing a cleaning disk for cleaning a reading and writing transducer of a floppy disk drive comprising:

sheet polymeric material formed into an envelope, the envelope having a circular central aperture formed through side surfaces thereof for receiving a spindle of a floppy disk drive to sense the presence of a cleaning disk enclosed within the envelope, the envelope further having a first aperture formed through a first side surface thereof for receiving a first reading and writing transducer, the envelope including an edge opening formed along one edge thereof for inserting a cleaning disk thereinto and for removing a cleaning dish therefrom, the envelope further including a reinforcing means at said edge opening thereof for increasing the mechanical rigidity of the envelope, said reinforcing means comprising a U-shaped strip of sheet polymeric material rigidly secured about an edge of one side surface of the envelope immediately adjacent to said edge opening in an enclosing manner about said edge of said side surface.

3. A cleaning disk for wet cleaning a reading and writing transducer of a floppy disk drive comprising:

a circularly-shaped disk of fibrous sheet cleaning material, the disk having a circular central aperture formed therethrough for engagement by a spindle of a floppy disk drive, the disk having a sensing aperture formed therethrough for permitting a floppy disk drive to sense the presence of the cleaning disk when the cleaning disk is inserted into a floppy disk drive, the disk further including a C-shaped optically opaque annular member within an annular region of a surface of the disk centered about said central aperture, said annular region including said sensing aperture of the disk, and said C-shaped opaque annular member being comprised of an opaque polymeric material rigidly secured to a surface of said disk.

4. The envelope of claims 1 or 2 further comprising:

a second aperture formed through a second side surface thereof for receiving a second reading and writing transducer of a floppy disk drive; and a cover bonded to a side surface thereof about one of said apertures for receiving a reading and writing transducer whereby said aperture is closed and sealed.

5. The cleaning disk of claims 1 or 3 wherein said C-shaped optically opaque annular member is formed from polymerized polyolefin material.

6. A cleaning disk assembly for cleaning the reading and writing transducers of a floppy disk drive comprising:

an envelope formed from Lexan polycarbonate for enclosing a cleaning disk, the envelope having a circular central aperture formed through side surfaces thereof for receiving a spindle of a floppy disk drive to sense the presense of a cleaning disk enclosed within the envelope, the envelope having a pair of apertures, opposite each other, formed through the side surfaces for receiving a pair of reading and writing transducers of a floppy disk drive whereby said transducers may contact the surfaces of a cleaning disk enclosed within the envelope, the envelope including a cover capable of being bonded to one of the side surfaces of the envelope in a manner which covers one of said apertures formed through a side surface, whereby said aperture is completely closed and sealed, the envelope further including an edge opening formed along one edge thereof for inserting a cleaning disk and for removing a cleaning disk therefrom, the envelope further including a reinforcing means at said edge opening thereof for increasing the mechanical rigidity of the envelope, with said reinforcing means comprising a U-shaped strip of sheet polymeric material rigidly secured about an edge of a side surface of the envelope immediately adjacent to said edge opening, in an enclosing manner about said edge;

a circularly-shaped cleaning disk for insertion into the envelope formed from porous spun-bonded polyolefin fabric, the disk having a circular central aperture formed therethrough for engagement by a spindle of a floppy disk drive, said central aperture surrounded by an annular reinforcing member made of polymerized polyolefin material and rigidly fastened to one side of said disk concentric to said central aperture, the disk also having a sensing aperture formed therethrough for permitting a floppy disk drive to sense the presence of the cleaning disk when the cleaning disk is inserted into a floppy disk drive, the disk further including a C-shaped optically opaque annular member within an annular region of a surface of the disk concentric about said central aperture, said annular region including said sensing aperture of the disk, and said C-shaped opaque annular member being comprised of an opaque polymerized polyolefin material rigidly secured to a surface of said disk; and a solvent located on the surface of and in the porous structure of the cleaning disk.

7. The cleaning disk of claim 3 further comprising a sealed envelope enclosing the disk and a quantity of cleaning solution, said cleaning solution being in contact with the cleaning disk.

* * * * *